US006846417B2

(12) United States Patent
Mayer et al.

(10) Patent No.: US 6,846,417 B2
(45) Date of Patent: Jan. 25, 2005

(54) CO-RETARDING AGENTS FOR PREPARING PURIFIED BRINE

(75) Inventors: Mateo Jozef Jacques Mayer, Giesbeek (NL); René Lodewijk Maria Demmer, Enter (NL)

(73) Assignee: Akzo Nobel N.V., Arnhem (NL)

( * ) Notice: Subject to any disclaimer, the term of this patent is extended or adjusted under 35 U.S.C. 154(b) by 215 days.

(21) Appl. No.: 10/216,530

(22) Filed: Aug. 9, 2002

(65) Prior Publication Data

US 2003/0049197 A1 Mar. 13, 2003

Related U.S. Application Data

(60) Provisional application No. 60/313,756, filed on Aug. 21, 2001.

(51) Int. Cl.$^7$ ............................ B01D 11/02; C22B 26/00
(52) U.S. Cl. ...................... 210/639; 210/663; 210/687; 210/729; 210/730; 210/731; 423/499.4; 423/499.5; 205/334; 23/295; 23/302 R
(58) Field of Search ................... 210/634, 638, 210/639, 660, 687, 696–702, 723–733, 749, 806; 423/164, 265, 499.4, 499.5, 554; 23/295, 302 R; 205/554

(56) References Cited

U.S. PATENT DOCUMENTS

| 2,433,601 | A | * | 12/1947 | Comstock ................... 423/186 |
| 2,902,418 | A | * | 9/1959 | Burns ......................... 205/536 |
| 2,906,599 | A | | 9/1959 | Roland |
| 2,906,600 | A | * | 9/1959 | Roland et al. .............. 423/181 |
| 3,140,915 | A | * | 7/1964 | Axelrad et al. ............. 423/275 |
| 3,155,458 | A | | 11/1964 | Fiedelman et al. |
| 3,649,219 | A | * | 3/1972 | Lynn et al. ................. 423/157 |
| 4,215,009 | A | * | 7/1980 | Spaziante et al. ........... 252/184 |
| 6,063,290 | A | * | 5/2000 | Failon et al. ............... 210/699 |

FOREIGN PATENT DOCUMENTS

| DE | 115 341 | 9/1975 |
| DE | 115 677 | 5/1999 |
| EP | 1 202 339 A2 | 5/2002 |

OTHER PUBLICATIONS

Derwent Abstract No. 81644W/50 abstracting DE 115–341.

* cited by examiner

Primary Examiner—Joseph Drodge
(74) Attorney, Agent, or Firm—Richard P. Fennelly

(57) ABSTRACT

The invention relates to a process to produce brine of improved purity by dissolving salt that contains a calcium sulfate source in water, in the presence of a retarding agent, while using one or more co-retardants to bind contaminants that could interfere with the retarding agents.

9 Claims, No Drawings

CO-RETARDING AGENTS FOR PREPARING PURIFIED BRINE

This application claims priority from U.S. Ser. No. 60/313,756, filed Aug. 21, 2001.

The present invention relates to a process for producing high purity brine by dissolution of a salt source containing alkaline (earth) impurities and the production of high quality salt from said brine.

Much of today's salt (essentially NaCl) is produced by means of evaporative processes wherein salt is crystallized from brine. The use of high purity brine has various' advantages in such a process.

Said brine is typically obtained by solution mining of rock salt deposits. Rock salt, mainly originating from maritime sedimentation, contains alkaline-earth metal (like Ca, Mg and Sr) and potassium salts as the most important impurities. Sulfate, chloride and bromide are typical counter-ions. Together with the sulfate ion, calcium will be present as the rather insoluble $CaSO_4$ (anhydrite) or/and as polyhalite ($K_2MgCa_2(SO_4)_4 \cdot 2H_2O$).

The total amount of calcium and sulfate in rock salt deposits depends on the deposit itself, but, for example, may also vary with the depth at which the salt is mined. Calcium is typically present in an amount from 0.5 to 6 gram per kilogram and sulfate from 0.5 to 16 gram per kilogram. Solution mining is a technique with which well soluble salts can be mined at special spots in a deposit. The advantage of this method is that poorly soluble impurities, like anhydrite ($CaSO_4$) and gypsum ($CaSO_4 \cdot 2H_2O$), will remain partly in the cavern being exploited. The resulting brine, however, can be saturated with these undesired impurities. Without any treatment the alkaline (earth) impurities in raw brine, obtained from any of the mentioned sources, will cause severe incrustations in the heating tubes of a vacuum crystallizer of NaCl. Hardly removable calcium sulfate in several appearances will block the tubes and frustrate the heat transfer. Inter alia, contamination of the resulting salt and poor energy efficiency of the process will be the consequence.

High purity brine is also of interest for processes wherein salt solutions are used as a raw material, such as in the chemical transformation industry, e.g. the chlorine and chlorate industry. Especially the conversion, from mercury and diaphragm technology to the more environmentally acceptable membrane technology triggered the demand for high purity brine. The brine for use in these processes is typically obtained by dissolution of a salt source, which can be rock salt, salt from evaporative processes as described above, and/or solar salt, including lake or sea salt. It is noted that sea salt typically contains less than 3 g/kg of $CaSO_4$ due to the fact that the $CaSO_4$ is typically present in the form of gypsum with just a limited solubility.

The use of higher purity brine was found to be of interest for this industry because it allows a better energy efficiency as well as the formation of less waste. Also the products resulting from the chemical transformation industry can be of higher quality if brine with high purity is used to make them.

Accordingly, there have been many efforts to improve the quality of brine. A first solution was to use high purity salt, which was dissolved to make such brine. Such high purity salt can be obtained by preventing calcium sulfate from crystallizing in the salt production process by adding specific seeds or by applying a scaling inhibitor. U.S. Pat. No. 3,155,458, for instance, discloses to add starch phosphate to the brine in the evaporative crystallization process. It is said that the starch phosphate enhances the solubility of the $CaSO_4$, and thus prevents the scaling and allows production of salt with high purity and low $CaSO_4$ content.

However, such a process requires the undesired bleed of a $CaSO_4$-rich stream from the crystallization process, and also requires that the brine is essentially bicarbonate-free.

Another solution is to remove impurities from the raw brine by a chemical treatment of said brine. An example of such a treatment is given in the already more than 100 years old Kaiserliches Patentamt DE-115677, wherein hydrated lime is used to precipitated magnesium hydroxide and gypsum from the raw brine.

In addition to, or instead of, these methods, there have also been efforts to increase the purity of the brine by reducing the amount of impurities, such as the above-mentioned anhydrite, gypsum, and polyhalite (and/or their strontium analoques), that dissolve into said brine. This is typically done by adding certain agents to the water that is used in the process, or by mixing such agents with the salt source before adding water (especially for solar salt dissolvers). Hereinafter, such conventional agents are called "retarding agents".

DD-115341 discloses that brine, particularly for use in processes to make soda ash, with a reduced amount of $CaSO_4$ and $MgSO_4$ can be obtained by adding calcium lignin sulfonate to the water that is used to produce the brine solution. The addition of calcium lignin sulfonate allegedly lowers the solubility of the $CaSO_4$ and $MgSO_4$. U.S. Pat. No. 2,906,599 discloses to use a group of phosphates, denominated "polyphosphates", including hexametaphosphates, to reduce the dissolution rate of calcium sulfate (anhydrite), leading to brine with reduced sulfate and calcium ions. At lower concentration (i.e. up to 50 ppm in the brine) hexametaphosphates were found to be the most effective agent, sodium hexametaphosphate being the preferred retarding agent.

Another type of retarding agent is being marketed by Jamestown Chemical Company Inc. under the name (Sulfate Solubility Inhibitor) SSI® 200. According to the material safety data sheet the material contains dodecylbenzene sulfonic acid, sulfuric acid and phosphoric acid.

Furthermore, non-prepublished European Patent application 01202339.6 discloses the use of a specific combination of compounds resulting in a reduction of the level of contaminants, particularly calcium sulfate, in brine obtained by dissolution of a salt source.

It was observed that the effectiveness of conventional retarding agents, or combination of retarding agents, varied from one dissolution process to the other. Upon closer investigation, it was observed that the presence of contaminants in the water that is used in the dissolution process had a distinct influence on the amount of alkaline-earth metal and potassium salt impurities.

After extensive research efforts, it was found that in particular the presence of clay minerals, humic acids or derivatives thereof, microorganisms or cell material originating from microorganisms, and lignin-containing organic materials in the water caused undesired variations in the retarding effect. Hence, the present invention relates to ways to remove and/or inactivate these contaminants of the water.

Accordingly, the invention relates to a process to make brine, by dissolving a salt source comprising a source of alkaline-earth metal sulfate in water, in the presence of at least one conventional retarding agent to reduce the amount of alkaline-earth metal sulfate dissolved in said brine, wherein at least one co-retardant is used prior and/or during the dissolution step in an amount that effectively binds at least part of the contaminants of the water.

The word "co-retardant" as used throughout this document is meant to denominate any conventional compound, or mixture of compounds, that is effective in binding the contaminants in the water that interfere in the process wherein the retarding agent binds to the source of alkaline-earth metal sulfate that is present in the salt. With "effective in binding" is meant that the efficiency of the retarding agent is improved with at least 5% when the water that is used, in the test as described below, is first treated with the co-retarding agent. Since the contaminants were found to particularly include clay minerals and lignin-containing organic materials, preferred co-retardants according to the invention comprise any products that are able to adsorb said clay minerals and lignin-containing organic materials. Preferably, the co-retardant does not, or very little, influence the effect of the retarding agent in the dissolution process. Typically, it will make sense to use the co-retardants in accordance with the present invention, when the efficiency of the retarding agent (or agents), in the absence of co-retardant, is 5% lower when the process-water is used, compared to the same test wherein demineralized water is used.

The co-retardant can be used in a pretreatment step wherein the water is combined with the co-retardant so that the contaminants are absorbed in or adsorbed onto the co-retardant. If so desired, the co-retardant can be recycled. However, in a preferred embodiment of the invention the co-retardant is used in a sacrificial way, meaning that the co-retardant and any contaminants combined therewith settle from the aqueous phase and are deposited in a suitable location. In subsequent steps the retarding agent can be added to the so-treated water and the salt source dissolved. In a more preferred embodiment, however, both retardant and co-retardant are added to the water, which combination is then used to dissolve the salt source. In a most preferred embodiment the retardant and the co-retardant are added to the water and the resulting solution is subsequently injected into a salt cavern, while a brine is removed at the same time or after a certain dissolution time. In said cavern the combination of co-retardant and contaminants are typically deposited at the bottom together with any combination that was formed from the retarding agent and alkaline (earth) impurities that were present in the salt source.

If the water that is used in the dissolution process of the invention originates from a (biological) water-treatment facility, e.g. a water treatment facility using activated sludge, it will typically contain microorganisms and/or cell material of such organisms. In that case, a preferred embodiment of the invention relates to a process wherein at least part of a conventional flocculant is added to the water during or after the treatment in said facility and wherein the flocculant is used in an amount sufficient to trap essentially all the contaminants of the water that interfere with the retarding agent.

Suitable co-retardants include suitable flocculants, lignosulfonate polymers, (graft)copolymers of lignosulfonate and acrylic acid, polyacrylic acid, and biopolymers, such as polysaccharides, modified starch, and polyacrylamides. Preferred are conventional flocculants, (graft)copolymers of lignosulfonate and polyacrylic acid. Most preferably the co-retardant that is used is a food-approved product.

It is noted that the term "salt" as used throughout this document is meant to denominate all salts of which more than 25% by weight is NaCl. Preferably, such salt contains more than 50% by weight of NaCl. More preferably, the salt contains more than 75% by weight of NaCl, while a salt containing more than 90% by weight NaCl is most preferred.

The salt may be solar salt (salt obtained by evaporating water from brine using solar heat), rock salt, and/or subterraneous salt deposits. Preferably it is a subterraneous salt deposits being exploited by means of dissolution mining. Since the various sources of the salt render salt with different compositions, especially with respect to contaminants, one typically has to evaluate the performance of the retarding agents to optimize their effect.

It was found that the so-obtained high purity brine could be used without further purification in both evaporative salt crystallization and the chemical transformation industry, such as mercury, diaphragm, membrane, or chlorate electrolysis processes. However, if so desired, the brine may be further purified by means of a conventional purification step, such as a chemical treatment. Also, it was found that the use of scaling inhibitors and/or specific seeds in the evaporative crystallization technique, to prevent $CaSO_4$ precipitation, is not required any longer. However, if so desired, the scaling inhibitors and/or specific seeds may be used in combination with the high purity brine of the present process, that is optionally further purified.

In a preferred embodiment, the invention relates to a process to make high purity brine from a salt source wherein anhydrite and/or polyhalite impurities are present as a source of alkaline-earth metal sulfate.

The performance of the combination of compounds as retarding agents, and whether or not the co-retardant interferes or is beneficial, is quickly and easily determined using the following dissolution test method. The salt source is crushed in order to obtain particles of 0.1 to 1.5 cm. A fresh stock solution of about 1000 mg/l retarding agent compound(s) is prepared and the desired amount of this stock solution (the amount to be evaluated) is added to a 1 liter beaker glass filled with such an amount of demineralized or process water that the total volume after adding the stock solution is 660 ml. A blank experiment, wherein no retarding compound is used, is conducted simultaneously. The beaker glass is stirred with a magnetic, Teflon coated, stir bar with a tapered round design and, a size of 50×9 mm (as obtainable from Aldrich Cat. No. Z28,392-4) at 200 rpm and thermostatted at 20° C. To this solution, 300 g of the crushed salt source, e.g. a core sample from a drilling, is added and the mixture is continuously stirred at 200 rpm. After 1 hour, samples are taken of the brine. For this purpose, the magnetic stirrer is stopped and a desired amount of brine sample is taken and filtered over a 0.2 micron ($\mu$m) filter. Subsequently, the filtered brine sample is analyzed on the amount of dissolved Ca, Mg, K, Sr, and/or $SO_4$ ions.

In order to test the long term performance of the retarding agents, the test can be continued for several days, preferably more than 5 days. In order to prevent erosion of the salt source, the mixture is not stirred in this period, and samples are taken once a day. Prior to sampling, the mixture is stirred by hand for one minute, using a 4 mm thick glass rod, so that the aqueous phase is homogeneous. The performance of the retarding agent is defined as the percentage that the concentration of the ions concerned is reduced as compared to the blank sample. If the action of a co-retardant is to be evaluated, the co-retardant is conveniently added to the process water before it is used in the test.

The performance of the retarding agent is preferably such that a retardation of the dissolution (in g/l) of at least one of the alkali metal ions, alkaline-earth metal ions, and/or sulfate ion is more than 20%, preferably more than 40, more preferably more than 50% and most preferably more than 70% is observed, when compared to the blank.

The amount of the co-retardant(s) that is to be used depends on the quality of the water to produce the brine, and the type of co-retardant(s) used. Generally, the total amount of co-retardant will be less than 0.2%, preferably less than 0.1%, more preferably less than 0.05% by weight of the water, while a concentration of less than 0.02% is most preferred. Typically, the co-retardant will be used in an amount greater than 0.1 mg/kg, preferably more than 1 mg/kg, and most preferably more than 5 mg/kg. Good results have been obtained at an addition level of 12–25 ppm, but the results have not been optimized yet.

The amount of the conventional retarding agents that is to be used depends on the quality of the salt source, the quality of the water to produce the brine, and the type of agents used. Generally, the amount for each retarding agent will be less than 0.1%, preferably less than 0.05%, more preferably less than 0.02% by weight of the water, while a concentration of less than 0.01% of each of the compounds is most preferred. The retarding agents are preferably materials with a molecular weight up to 1000, more preferably up to 800, even more preferably up to 600, even more preferably up to 500, and most preferably up to 400 Dalton, since materials with higher molecular weights were found to be less effective retarding agents.

Conventional retarding agents are generally selected from phospholipides, hydrolyzed phospholipides, alkylbenzene sulfonates, whereof the alkyl groups can be linear or branched, phosphates, preferably polyphosphates, including alkali metal and ammonium polyphosphates that are water-soluble, ethoxylated compounds with one or more sulfite, sulfonate, sulfate, phosphite, phosphonate, phosphate, and/or carboxylgroups, and/or $C_2$–$C_{40}$ alkylgroups, preferably $C_2$–$C_{20}$ alkylgroups, with one or more sulfite, sulfonate, sulfate, phosphite, phosphonate, phosphate, and/or carboxyl groups.

The term polyphosphate includes metaphosphates, such as hexametaphosphate $(Na_3PO_3)_6$, tripolyphosphates $(Na_5P_3O_{10})$, tetraphosphates $(Na_6P_4O_{13})$, pyrophosphates, such as $Na_4P_2O_7$ and $Na_2H_2P_2O_7$, as well as various other complex phosphates that are typically derived from orthophosphoric acid compounds by molecular dehydration, and mixtures of two or more of these phosphates.

The invention is elucidated in the following examples, which are not to be seen as limiting the invention.

EXAMPLE 1 AND COMPARATIVE EXAMPLES A–D

In the following, non optimized, examples, a core from a drilling near Delfzijl, the Netherlands, was used as the salt source.

| | | | | Ca | | | $SO_4$ | |
|---|---|---|---|---|---|---|---|---|
| water | retarding agent | co-retardant | t = 0 | t = 2 days | eff | t = 0 | t = 2 days | eff |
| A Demi | None | None | 0.42 | 0.50 | n.r. | 1.87 | 2.35 | n.r. |
| B Demi | SSI 200 | None | 0.22 | 0.28 | 44 | 1.01 | 1.34 | 43 |
| C Surf | SSI 200 | None | 0.40 | 0.48 | 4 | 1.73 | 2.30 | 2 |
| D Surf | None | Ultra | 0.52 | 0.60 | 0 | 2.16 | 2.74 | 0 |
| 1 Surf | SSI 200 | Ultra | 0.32 | 0.40 | 20 | 1.34 | 1.92 | 18 |

The retarding agent and co-retardant were used in an amount of 30 mg/l, based on the volume of all water used in the test (660 ml). The amount of ions as presented is expressed in g/l of the total solution that is finally obtained in the test. Comparative Example A is the blanc and the basis for the efficiency calculations.
eff=efficiency (%) after two days
n.r.=not relevant
Demi=demineralized water
Surf=surface water, taken from a water stream near Delfzijl, the Netherlands.
SSI 200=commercial retarding agent ex Jamestown Chemical.
Ultra=Lignosulphonate copolymer Ultrazine®, supplied by Lignotech in Norway.

Clearly, the use of surface water adversely influenced the performance of the retarding agent. The use of the co-retardant significantly improved the efficiency of the retarding agent when the surface water was used.

EXAMPLE 2 AND COMPARATIVE EXAMPLES E–G

The previous example was repeated with a salt core sample that was obtained from a drilling near Hengelo, the Netherlands. The salt core contained clay minerals which, during dissolution, interfered with the performance of the conventional retarding agent.

| | | | | Ca | | | $SO_4$ | |
|---|---|---|---|---|---|---|---|---|
| water | retarding agent | co-retardant | t = 0 | t = 4 days | eff | t = 0 | t = 4 days | eff |
| E Demi | None | None | 1.66 | 1.66 | n.r. | 4.13 | 4.13 | n.r. |
| F Demi | SSI 200 | None | 1.56 | 1.60 | 4 | 3.94 | 3.98 | 3 |
| G Demi | HMF | None | 0.92 | 1.02 | 39 | 2.35 | 2.59 | 37 |
| 2 Demi | HMF | Ultra | 0.82 | 0.92 | 45 | 2.16 | 2.16 | 43 | eff = efficiency (%) after four days
n.r. = not relevant
Demi = demineralized water
SSI 200 = commercial retarding agent ex Jamestown Chemical, used in an amount of 30 mg/l, based on the volume of all water used in the test (660 ml).
HMF = sodium hexa metaphosphate as supplied by Vos, used in an amount of 60 mg/l, based on the volume of all water used in the test (660 ml).
Ultra = Lignosulphonate copolymer Ultrazine ®, supplied by Lignotech in Norway, used in an amount of 30 mg/l, based on the volume of all water used in the test (660 ml).

The amount of ions as presented is expressed in g/l of the total solution that is finally obtained in the test.

Clearly the retarding efficiency of HMF is improved by using the co-retardant.

EXAMPLES 3 AND COMPARATIVE EXAMPLES H–J

In these examples, a brine was produced in accordance with the test method as described. In Example 3 60 mg/l of HMF and 30 mg/l of a commercial flocculant (Synthofloc®), both based on the volume of all water used in the test (660 ml), was used. In Comparative Example H no retarding agent and no coretardant was used, in Comparative Example I 30 mg/l of sodium benzenesulphonate (a retarding agent) was used, and in Comparative Example J a combination of two retarding agents, viz 60 mg/l of HMF and 30 mg/l of sodium benzenesulphonate, both based on the volume of all water used in the test (660 ml), was used. After producing the brine, the stirrer was stopped and the clarity of the brine was evaluated after 30 minutes. The brine of Example 3 was clear, with residual salt and flocculated contaminants having settled, the brine of the other examples was still very turbid. This demonstrates that dissolution mining in subterranean caverns will be much improved if retarding and co-retarding agents are used in accordance with the invention.

What is claimed is:

1. A process to make brine, by dissolving a NaCl salt source comprising a source of alkaline-earth metal sulfate in water, in the presence of at least one retarding agent to reduce the amount of alkaline-earth metal sulfate dissolved in said brine, wherein a co-retardant selected from the group consisting of flocculants, lignosulfonate polymers, (graft) copolymers of lignosulfonate and acrylic acid, polyacrylic acid, polyacrylamides, and biopolymers, and modified starch is used prior and/or during the dissolution step in an amount of from 0.1 mg/kg to 0.2 % by weight, based on the weight of the water, and wherein said at least one retarding agent has a performance such that a retardation of the dissolution (in g/l) is achieved of at least one of the alkaline-earth metal ions and/or sulfate ions of more than 20% when compared to a dissolution step wherein no retarding agent is used.

2. A process according to claim 1, wherein the co-retardant is used in an amount of less than 0.1% by weight of the water.

3. A process as claimed in claim 2 wherein the co-retardant is used in an amount of less than 0.05% by weight of the water.

4. A process as claimed in claim 2 wherein the co-retardant is used in an amount of less than 0.02%, by weight of the water.

5. A process according to claim 1 wherein the retarding agent is selected from the group consisting of:

phospholipides, hydrolyzed phospholipids, alkylbenzene sulfonates, whereof the alkyl groups are linear or branched, phosphates that are water-soluble, ethoxylated compounds with one or more sulfite, sulfonate, sulfate, phosphite, phosphonate, phosphate, and/or carboxylgroups, and $C_2$–$C_{40}$ alkyl compounds with one or more sulfite, sulfonate, sulfate, phosphite, phosphonate, phosphate, and/or carboxyl groups.

6. A brine obtained from the process of any one of claims 1, 2 and 5 comprising traces of at least one retarding agent and of co-retardant.

7. An electrolysis process or evaporative crystallization process wherein the brine according to claim 6 is used, optionally after an additional purification step.

8. An electrolysis process as claimed in claim 7 which is a mercury, diaphragm, membrane, or chlorate electrolysis process.

9. An electrolysis process as claimed in claim 7 which is a membrane electrolysis process.

* * * * *